March 13, 1951
H. RUMSEY, JR
2,545,243
PACKAGE ENCASED IN PLASTIC SHEET MATERIAL
AND METHOD OF MAKING THE SAME
Filed July 10, 1948
2 Sheets-Sheet 1
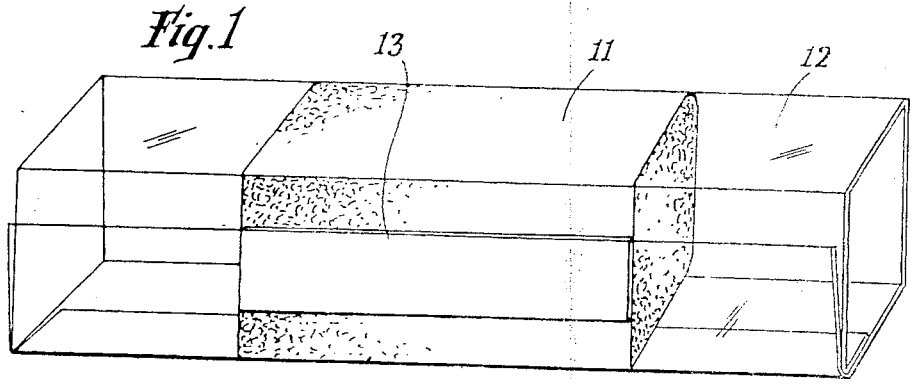
*Fig. 1*
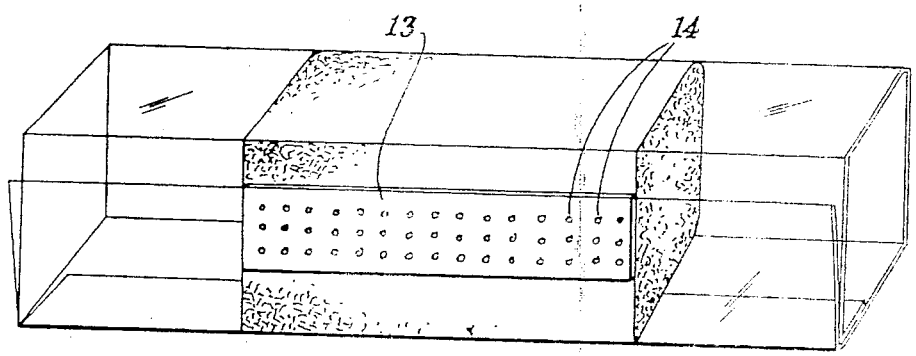
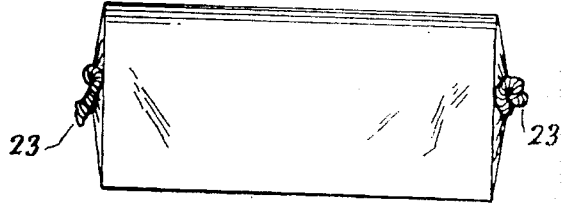
*Fig. 2*
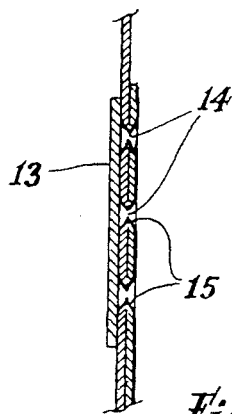
*Fig. 5.*
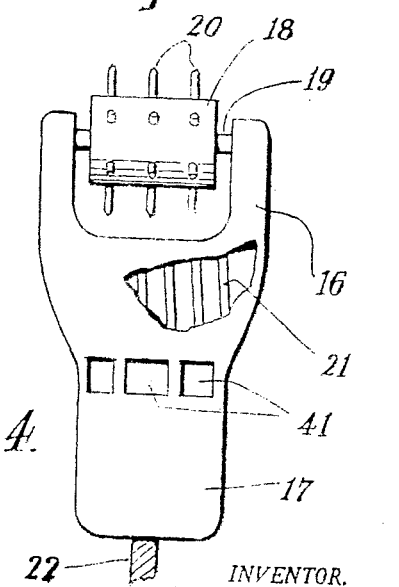
*Fig. 4.*
*Fig. 3.*
INVENTOR.
HERBERT RUMSEY Jr.
BY
*Snell & Kane*
ATTORNEYS March 13, 1951 H. RUMSEY, JR 2,545,243
PACKAGE ENCASED IN PLASTIC SHEET MATERIAL
AND METHOD OF MAKING THE SAME
Filed July 10, 1948 2 Sheets-Sheet 2

INVENTOR.
HERBERT RUMSEY Jr.
BY Duell & Kane
ATTORNEYS

Patented Mar. 13, 1951

2,545,243

UNITED STATES PATENT OFFICE 2,545,243

PACKAGE ENCASED IN PLASTIC SHEET MATERIAL AND METHOD OF MAKING THE SAME

Herbert Rumsey, Jr., Rochester, N. Y.

Application July 10, 1948, Serial No. 37,978

5 Claims. (Cl. 18—56)

1

This invention relates to an improved package encased in plastic sheet material and to an improved method of making the same.

It is an object of the invention to produce in a simple and inexpensive manner an improved attractive package encased in plastic sheet material so that the sheet material is smooth and unwrinkled and relatively tightly stretched around the package.

My invention contemplates in certain of its aspects the use of thermoplastic sheet wrapping material and it is a further object of the invention to provide a simple and effective manner of heat-sealing the thermoplastic material and at the same time to provide for the escape of air from inside the package as the plastic sheet material is secured and tightened around the package.

In the use of thermoplastic sheet materials it is frequently desirable to connect portions thereof by fusing or heat-sealing. However, in the case of thin thermoplastic sheet material this presents difficulty since the heating of the materials is critical. If the material is insufficiently heated it will not fuse to join the several layers together. A slight over-heating on the other hand, causes the material, because of its thinness, to entirely melt away and disappear. My improved method overcomes these difficulties and provides a sure and safe method of joining thin thermoplastic materials together by fusing or heat-sealing.

In the accompanying drawings—

Fig. 1 is a perspective view from the undersurface showing one step in the making of my package;

Fig. 2 is a similar view showing a further step;

Fig. 3 is a detailed sectional view showing the perforations made in the overlapping portions of the material and illustrating the manner in which the edges are fused together;

Fig. 4 is an elevational view of apparatus that may be used in heat-sealing the material;

Fig. 5 is a top plan view of the package in partially completed condition;

2

Figure 6:
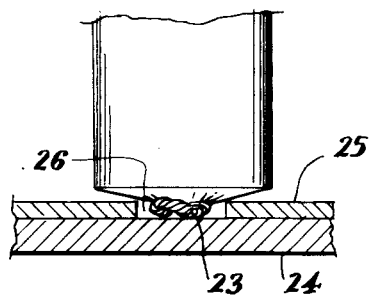
Fig. 6 is a detailed view illustrating the step of fusing or sealing the twisted ends of the package.

My invention is applicable to making many different types of packages. Among other things, it is suitable for the wrapping of food products such as meat products and the wrapping material described herein may serve as a synthetic or artificial casing for the food products.

Referring to the first form of my invention I have illustrated the invention as applied to wrapping a meat loaf 11 in a thin sheet of transparent thermoplastic material 12. For the purposes of the present invention I have found it desirable to use a thermoplastic film of the type which can be readily shrunk after it has been applied to the package such as the polyvinyl films that will shrink when subjected to heat lower than their sealing or plasticizing temperature. For this purpose I prefer to use polyvinylidene chloride film which is commercially available under the trade name Saran. I employ a sheet of material wide enough to be wrapped around the contents of the package with the longitudinal edges in overlapping relationship and long enough to project beyond the ends of the package when thus wrapped.

The first step in my method is illustrated in Fig. 1 in which the sheet 12 is wrapped around the meat loaf 11 with the longitudinal edges substantially overlapped, preferably at the bottom of the proposed package. The film then projects beyond the two ends of the meat loaf as shown. For reasons hereinafter explained I prefer to place a protective sheet 13 of parchment paper or similar material directly against the meat loaf beneath the overlapped portions as shown in Figs. 1 and 2.

Thereafter, I desire to heat-seal or fuse the overlapped portions of the sheet wrapping material together. This presents practical difficulties due to the thinness of the material since slightly excessive heat causes the sheet or film to melt away. I have found that the overlapped layers can be readily fused or joined together in a relatively simple manner by applying heat to the overlapped layers at a plurality of spaced points. The heat is in excess of the fusing temperature of the material and produces apertures extending through the two overlapped layers. Three rows of such apertures are illustrated at 14 in Fig. 2 but the number, arrangement and spacing of the apertures may be greatly varied.

After the apertures have thus been formed the fused areas are permitted to cool and to set while the apertures are maintained in registry with the result that the areas of the overlapped layers immediately surrounding the apertures are fused or welded together as shown at 15 in Fig. 3.

The heat can be applied at a plurality of points and the apertures formed by means of a series of heated rods formed substantially of the size of the apertures. Such an arrangement is shown in Fig. 4 where a forked bracket 16 provided with a handle 17 is used to support a rotary roller 18 mounted on shaft 19. The roller has three series of rods or projections 20 which are used to form the apertures in the overlapped thermoplastic material. An electric heating element 21 supplied with current through the feed cord 22 serves to supply heat to the upper portion of the bracket which is transmitted to the roller and thus to the projections or rods 20. The rods or projections should be maintained at a heat above the fusing or melting point of the plastic material and in the case of Saran this should be above 280° F. The handle portion 17 may be made of heat insulating material and heat transmission from the upper portion may be partially blocked by a series of apertures as indicated at 41.

The sealing device shown in Fig. 4 is heated to the proper temperature and then is drawn over the lower surface of the package with the projections 20 in contact with the overlapped portion of the thermoplastic sheet material with the result that the apertures are formed therein. The layer of parchment 13 immediately beneath the overlapped layers remains unperforated as shown in Fig. 3 due to the brief period of contact. The parchment therefore serves to protect the package contents from direct contact with the heated rods or projections 20. As previously stated, the apertures are maintained in registry while the fused areas cool or set with the result that the overlapped layers immediately surrounding the apertures are fused or welded together as clearly shown in Fig. 3.

The heat emanating from the heat sealing apparatus also has the effect of shrinking the Saran particularly around the lower portion of the package causing it to fit more tightly.

Thereafter, the protruding ends of the sheet material beyond the two ends of the meat loaf are suitably closed and tightened as by twisting in tightly spiralled fashion as indicated at 23 in Fig. 5. The twisting may be accomplished manually or by twisting apparatus such as shown in my Patent No. 2,346,613 of April 11, 1944. The twisting has the effect of drawing the ends of the sheet material inwardly against the ends of the meat loaf by forming a plurality of radial pleats tapering outwardly from the center of the two ends towards the periphery. The twisting should be continued sufficiently to tightly stretch the plastic sheet material and to produce the spiral effect shown.

While the ends are being closed and tightened it is desirable that the air inside the wrapping be permitted to escape so as not to form any air pockets and not to rupture the material. It will be seen that the apertures 14 provided in connection with the heat sealing permit the air to thus escape.

After the ends have been spirally twisted they may be further secured against accidental opening by being fused. In this connection only the spirally twisted portions should be fused and the wrapping material at the ends of the package outside of the spirally twisted portions should be suitably protected. This can be accomplished by means of the apparatus indicated in Fig. 6 consisting of a hot plate 24 maintained at a temperature above the fusing temperature of the material, and a heat insulating shield 25 disposed over the plate and provided with an aperture 26 barely large enough to accommodate the spirally twisted portion. The end of the package is applied to the apparatus in the manner shown with the spirally twisted end engaging the hot plate and the remainder of the material protected by the heat insulating shield. The contact is maintained long enough to partially fuse the spirally twisted end. It is then withdrawn and permitted to set resulting in a partly fused or welded area such as shown at 27 in Fig. 7. The spiral twisting at both ends of the package may be thus secured by fusing.

Figure 7:
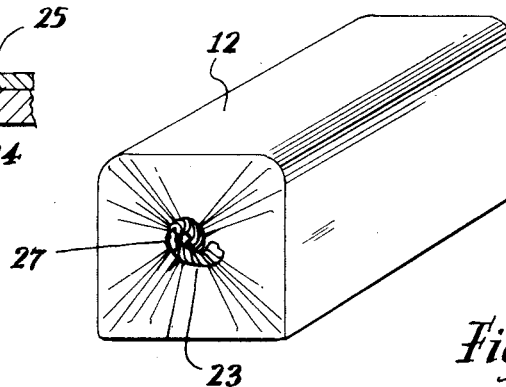
Fig. 7 is a perspective view of the completed package.

Thereafter the package may be used in that manner or if desired the plastic sheet material may be further tightened around the package to remove any wrinkles or looseness by being shrunk therearound. In the case of Saran this can be conveniently accomplished by subjecting the closed upper portion of the package to heat below the plasticizing temperature of the material. A satisfactory method of accomplishing this is by dipping the upper edge of the package in water maintained above 160° F. preferably approximately 190° F. This slight additional shrinking removes any remaining wrinkles or looseness thereby producing a package of attractive appearance encased in a smooth tight fitting plastic sheet material as shown in Fig. 7. During the shrinking operation the air may likewise escape through apertures 14.

Figure 8:
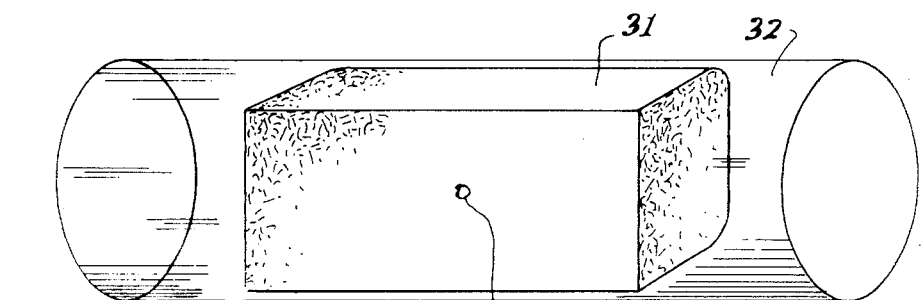
Fig. 8 is a view of the first step in a modified method of making a package embodying my invention.
Figure 9:
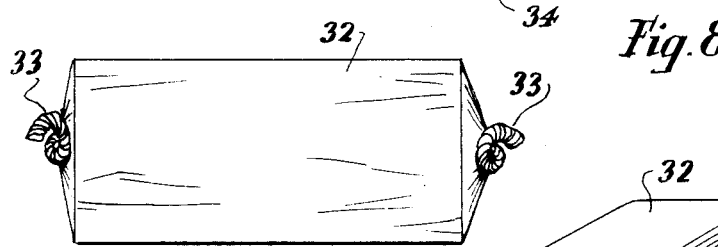
Fig. 9 is a top plan view of the partially completed modified package.
Figure 10:
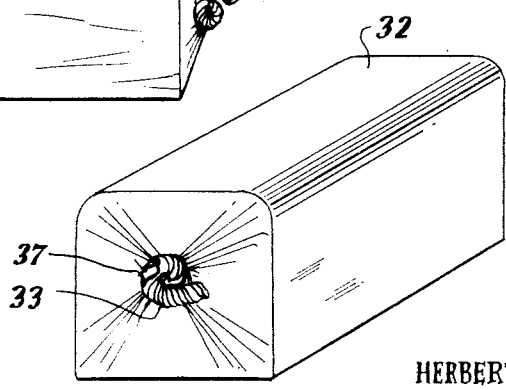
Fig. 10 is a perspective view of the completed package.

In the modified form of my invention shown in Figs. 8–10 a seamless tube 32 of similar thin plastic material is used to package the contents which again is illustrated as a meat loaf 31.

The tube should be of the type which, as previously explained, can be readily shrunk around the package after it has been wrapped and as in the first form of my invention I prefer to use for this purpose a polyvinylidene chloride film commercially available under the trade name Saran. One or more apertures such as shown at 34 should be formed in the tube preferably at the undersurface of the package. The tube should be large enough to accommodate the meat loaf or other contents but should not be too loose and should project beyond the ends thereof.

The meat loaf is centrally positioned in the tube as shown with its lower surface facing the aperture. The projecting ends of the tube are then twisted in the manner previously described producing the spirally twisted portions 33. As in the first form of my invention the twisting of the ends draws the sheet material inwardly against the ends forming radial pleats tapering from the center of the ends towards the periphery. The twisting is continued sufficiently to pull the sheet material tightly towards the ends and to form the tight spiral as shown. During this operation the air can escape through aperture 34. The spirally twisted ends may then be fused in the manner shown in Fig. 6.

At this point in my method the tubular casing has a certain amount of slack or looseness resulting in wrinkles. These can be eliminated by subjecting the Saran to heat below its plasticizing temperature preferably in the manner previously described by dipping the upper portion thereof in water maintained at a temperature above 160° F. preferably approximately 190° F. This results in a finished package of attractive appearance encased in plastic sheet material which is free from wrinkles and which is tightly stretched around the package as shown in Fig. 10.

It will be appreciated that my invention is relatively simple and inexpensive to carry out, that it is applicable to many different types of products and that it is particularly suitable for use in connection with various food products. In the latter connection my improved form of wrapping may serve as an artificial casing. I have also provided an improved method of fusing or sealing layers of thermoplastic materials together, while at the same time providing for the escape of air. Modifications may of course be made in the illustrated and described embodiment of my invention without departing from the invention as set forth in the accompanying claims.

I claim:

1. A package comprising package contents and a wrapping in the form of a relatively thin sheet of thermoplastic material secured therearound with edges of the thermoplastic material in overlapping relationship, said overlapping portions having a plurality of proximately positioned apertures extending through both layers of the material in registry with each other and providing communication between the atmosphere and the inside of the package and the layers being fused together immediately around the edges of the apertures whereby the overlapping portions are attached together.

2. A package comprising package contents and a wrapping in the form of a relatively thin sheet of thermoplastic material relatively tightly stretched around the contents with its longitudinal edges in overlapping relationship and with its ends secured at the ends of the package said overlapping longitudinal portions being provided with a plurality of proximately positioned apertures extending through both layers of material in registry with each other providing communication between the atmosphere and the inside of the package and the layers being fused together immediately around the edges of the apertures whereby the overlapping longitudinal portions are attached together.

3. A package as set forth in claim 1 in which the thermoplastic sheet material is a polyvinyl plastic of the type which shrinks when subjected to heat lower than its plasticizing temperature.

4. The method of making a package which comprises wrapping a relatively thin sheet of thermoplastic material which shrinks when subjected to heat lower than its plasticizing point around the package contents with the longitudinal edges in overlapping relationship, then subjecting the overlapping portions of the thermoplastic material to heat above the fusing point thereof at a plurality of points so as to form a plurality of apertures extending through both layers, next maintaining the apertures in the respective layers in registry with each other while the fused portions of the thermoplastic material sets so that the layers of material become fused together around the edges of the apertures, and finally shrinking the thermoplastic sheet material around the package by subjecting it to heat lower than its plasticizing point so that it fits relatively tightly around the contents while at the same time leaving the aperture unobstructed to permit the air to escape therethrough.

5. The method of making a package which comprises first wrapping a relatively thin sheet of thermoplastic material around the package contents with the longitudinal edges in overlapping relationship and with the ends of the material protruding beyond the two ends of the package, then subjecting the overlapping portions of the thermoplastic material to heat above the fusing point thereof at a plurality of points so as to form a plurality of apertures extending through both layers, next permitting the fused portions of the thermoplastic material to cool while maintaining the apertures and their respective layers in registry with each other so that the layers of thermoplastic material become fused together around the edges of the apertures, and finally twisting the protruding ends of the thermoplastic material so as to draw the material inwardly against the ends of the package and thereby close the package while at the same time leaving the apertures unobstructed to permit the air to escape therethrough while the ends are being closed.

HERBERT RUMSEY, Jr.

REFERENCES CITED

The following references are of record in the file of this patent:

UNITED STATES PATENTS

| Number | Name | Date |
| --- | --- | --- |
| 1,583,381 | Zimmerman | May 4, 1926 |
| 2,004,041 | Driver | June 4, 1935 |
| 2,037,631 | Hultin | Apr. 14, 1936 |
| 2,256,156 | Snyder | Sept. 16, 1941 |
| 2,301,086 | Snyder | Nov. 3, 1942 |
| 2,301,106 | Brown | Nov. 3, 1942 |
| 2,342,977 | Snyder | Feb. 29, 1944 |
| 2,433,622 | Novak | Dec. 30, 1947 |

FOREIGN PATENTS

| Number | Country | Date |
| --- | --- | --- |
| 256,792 | Great Britain | Aug. 19, 1926 |